P. C. FLAGSTAD, O. HANSEN & O. FLAGSTAD.
MACHINE FOR MAKING PASTRY CONES.
APPLICATION FILED FEB. 27, 1909. RENEWED OCT. 30, 1913.
1,086,448.
Patented Feb. 10, 1914.
4 SHEETS—SHEET 2.
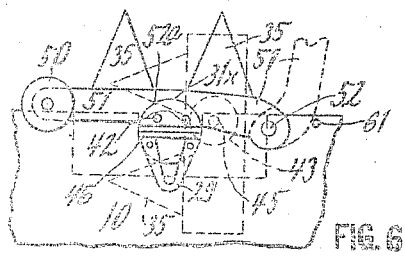
FIG. 6.
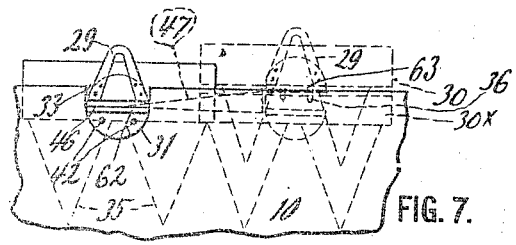
FIG. 7.
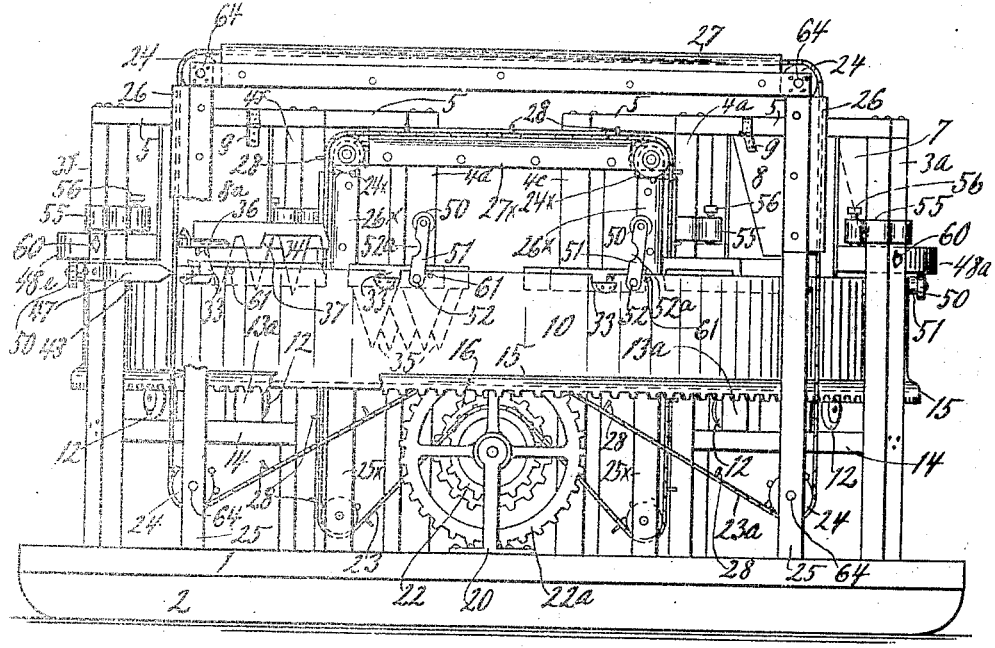
FIG. 2.
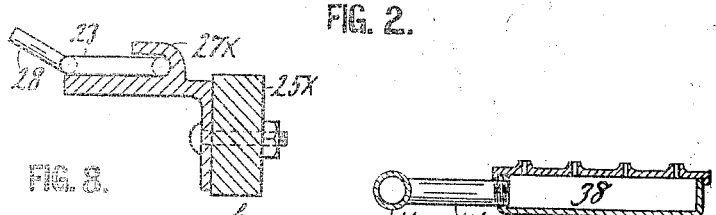
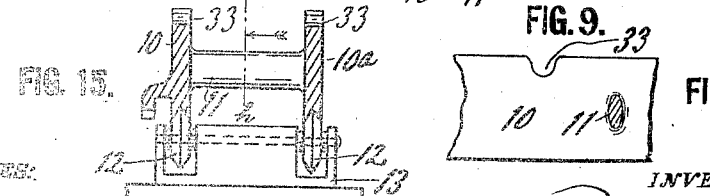

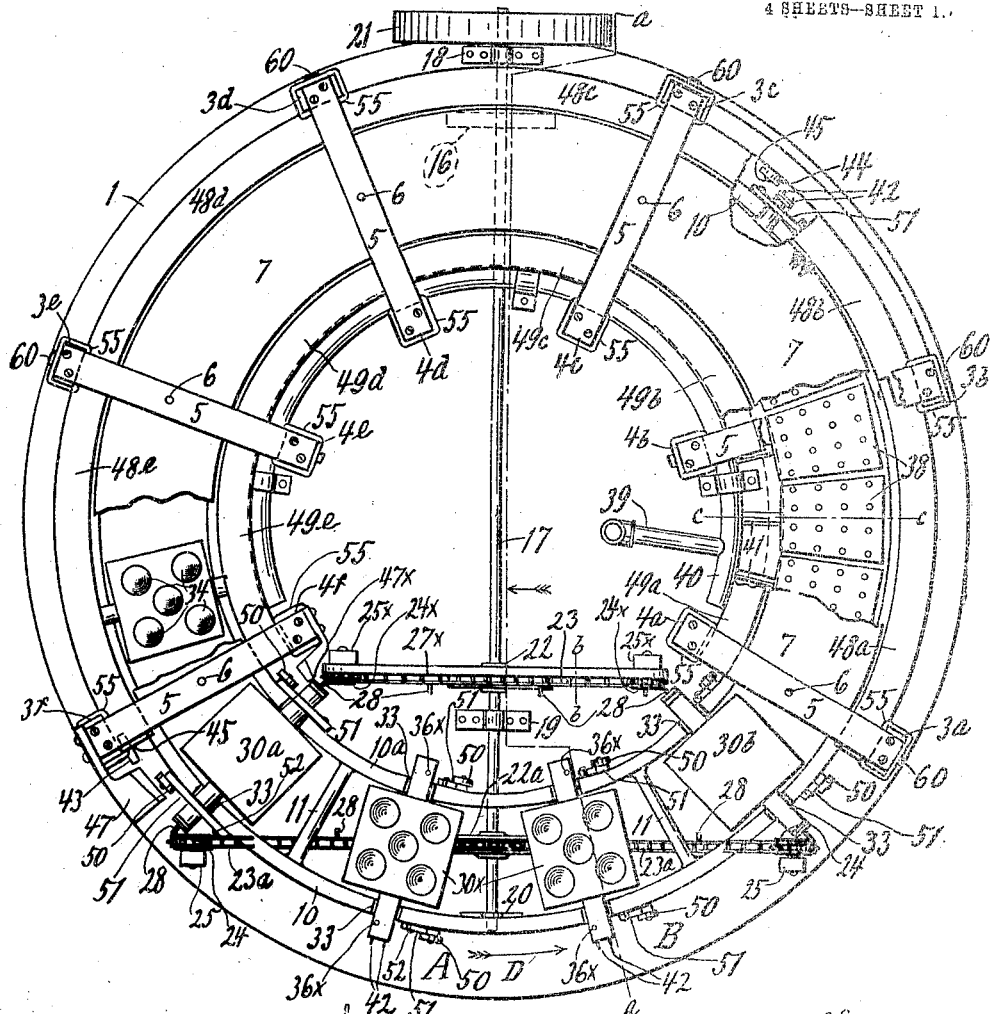

P. C. FLAGSTAD, O. HANSEN & O. FLAGSTAD.
MACHINE FOR MAKING PASTRY CONES.
APPLICATION FILED FEB. 27, 1909. RENEWED OCT. 30, 1913.
1,086,448.
Patented Feb. 10, 1914.
4 SHEETS—SHEET 3.
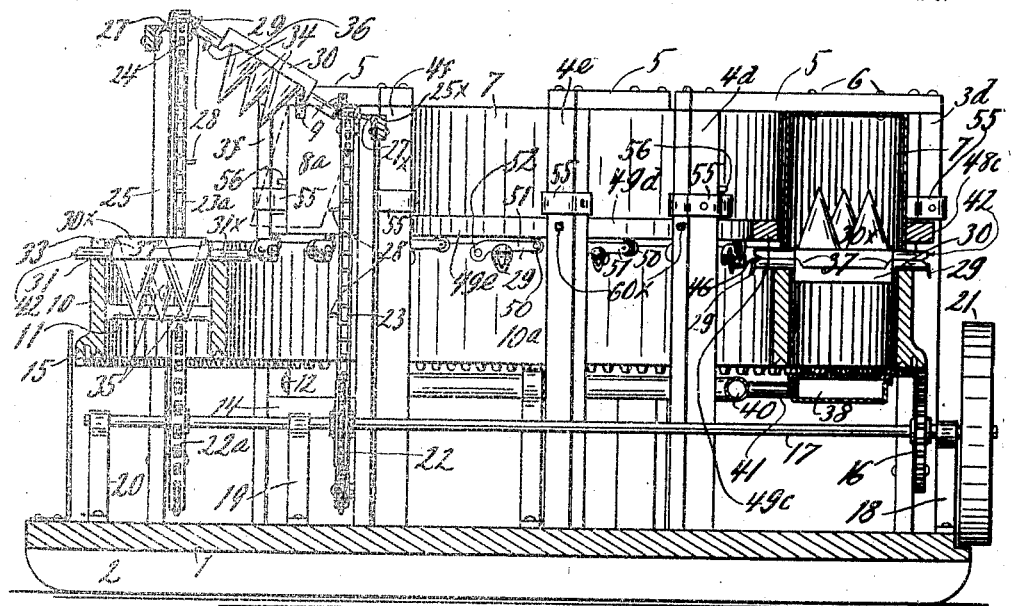
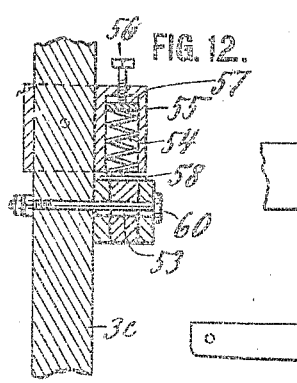
FIG. 12.
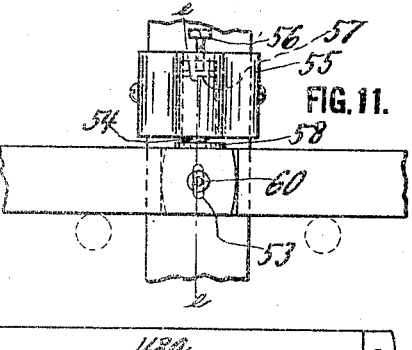
FIG. 3.
FIG. 11.
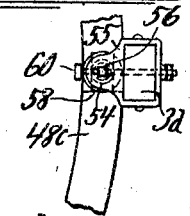
FIG. 13.
FIG. 10.
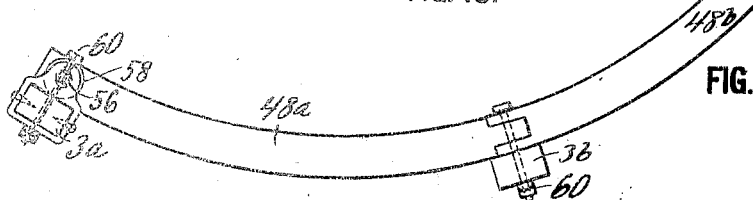
FIG. 14.
WITNESSES:
D. E. Carlsen
E. H. Erickson
INVENTORS
Pernie Flagstad,
Oscar Hansen
& Oscar Flagstad,
BY their ATTORNEY:
A. M. Carlsen.

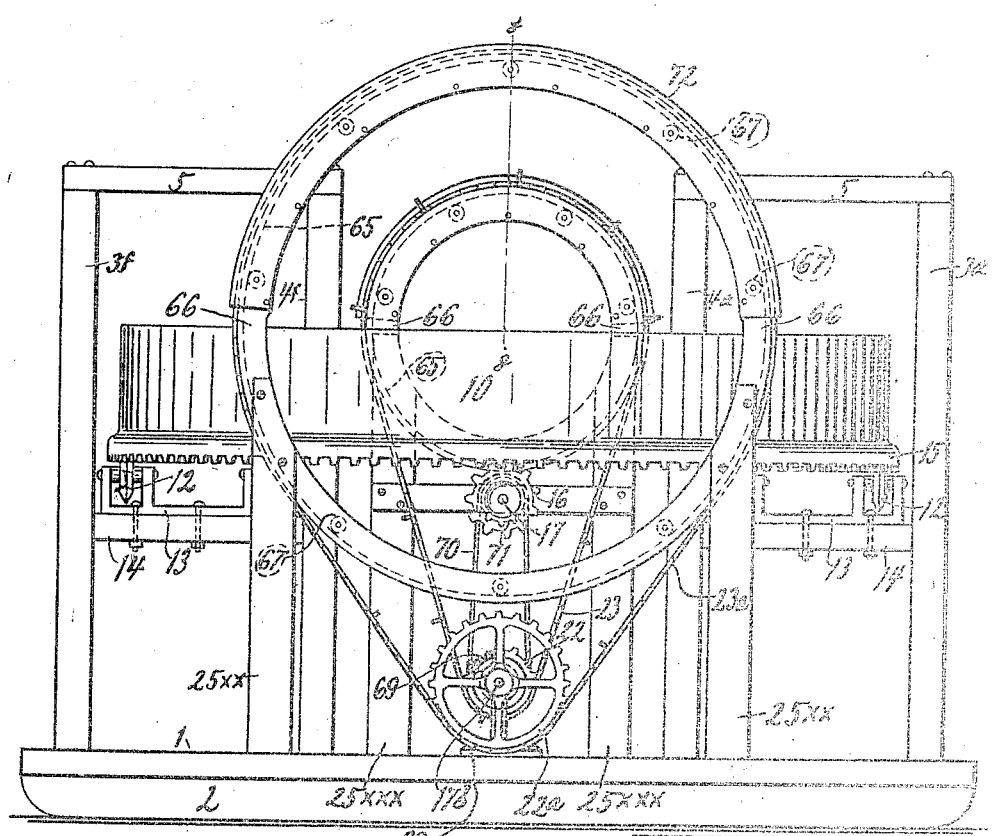

UNITED STATES PATENT OFFICE.

PETER CORNIE FLAGSTAD, OSCAR HANSEN, AND OSCAR FLAGSTAD, OF ST. PAUL, MINNESOTA, ASSIGNORS, BY MESNE ASSIGNMENTS, TO ROBERT G. CARGILL AND FREDERICK W. PEPPER, BOTH OF MINNEAPOLIS, MINNESOTA.

MACHINE FOR MAKING PASTRY CONES.

1,086,448. Specification of Letters Patent. Patented Feb. 10, 1914.

Application filed February 27, 1909, Serial No. 480,454. Renewed October 30, 1913. Serial No. 798,317.

*To all whom it may concern:*

Be it known that we, PETER CORNIE FLAGSTAD, OSCAR HANSEN, and OSCAR FLAGSTAD, citizens of the United States, residing at St. Paul, in the county of Ramsey and State of Minnesota, have invented a new and useful Machine for Making Pastry Cones, of which the following is a specification.

This invention relates to machines for making hollow pastry cones or similar cups of pastry for containing ice-cream; and the object is to provide a novel, partly automatic power-operated machine for the rapid and cheap production of said articles of pastry.

In the accompanying drawings, Figure 1 is a top view of the machine with certain portions broken away to expose other parts. Fig. 2 is a front elevation of the machine with some of the upper members of the cone molds at the front removed and one of the frame posts to the left partly broken away. Fig. 3 is a vertical section on the line $a$—$a$ in Fig. 1 of the complete machine. Fig. 4 is a detail side elevation of one of several molds in which the pastry cones are formed and baked, and portions of the chains that open and close the molds, one of the members of the mold is also shown in dotted line in the upper part of the view. Fig. 5 is an end view of the mold shown in Fig. 4. Fig. 6 is an end view of one of the molds and the adjacent means for supporting, squeezing and turning it. Fig. 7 is an end view of one of the molds and its supporting means and one of two fixed wedges for separating the members of the molds preparatory to opening them. Fig. 8 is an enlarged cross section on line $b$—$b$ in Fig. 1 showing the method of guiding the chains or link belts. Fig. 9 is a vertical section on the line $c$—$c$ in Fig. 1 of the gas burner by which the baking is done. Fig. 10 is a top view of a portion of the outer curved rail by which the molding members are pressed together during the baking process, and the frame posts holding said rail in position. Fig. 11 is an inner side view of the portion $d$—$d$ of the rail and the adjacent post in Fig. 10. Fig. 12 is a vertical cross section on the line $e$—$e$ in Fig. 11. Fig. 13 is a detail side elevation of either the rail section $48^a$ in Fig. 10 or the section $49^a$ of the inner curved rail in Fig. 1. Fig. 14 is an inner side elevation of either the end section $48^e$ or $49^a$ of the curved rails in Fig. 1. Fig. 15 is a radial section through the horizontally turning large wheel $10$—$10^a$, that carries the molds during the baking process. Fig. 16 is a section on line $h$—$h$ in Fig. 15. Fig. 17 is a front elevation of the main frame work and the opening and closing means for the molds modified. Fig. 18 is a vertical section on the line $g$—$g$ in Fig. 17.

Referring to the drawings by reference numerals, 1 designates a platform or base preferably fixed upon skids 2 which are rounded at the ends to facilitate moving of the machine. Upon said base is fixed a circular row of frame posts $3^a$, $3^b$, $3^c$, $3^d$, $3^e$, and $3^f$, forming about three-fourths of a circle, and concentrically there-within is fixed on the base a smaller circle of inner posts $4^a$, $4^b$, $4^c$, $4^d$, $4^e$, and $4^f$. Each outer post has its top firmly secured to the top of the nearest inner post by a frame bar 5, from which is suspended by screws 6 a sheet metal oven 7, which forms about three-fourths of a circle and is in radial cross section of an inverted U-shape, as best shown in the upper right hand corner of Fig. 3. The ends of the oven are provided with doors 8 and $8^a$, each suspended by hinges 9 from the end of the roof of the oven and arranged to swing, the door 8 into and the door $8^a$ out from the respective door openings.

Close below the open base of the oven described and arranged centrally to the circle or curve thereof, is mounted to rotate horizontally a spokeless wheel or double ring $10$—$10^a$, the two rings being united by flat radial braces 11, (see Figs. 15 and 16) turned edge down so as to interfere as little as possible with the fire and heat passing upward between them, as will presently be more fully described. The lower edges of one or both of said rings of the wheel are guidingly supported on rollers 12 mounted by castings 13 as in Fig. 15, or blocks $13^a$ in Fig. 2, fixed upon horizontal frame bars 14, or other parts of the main frame work. One of the rings composing the large wheel 10, in the present instance the outer ring, is provided with a depending circular rack 15, with which meshes a cog pinion or wheel 16, fixed on a horizontal shaft 17 extending centrally from front to rear of the machine, and being mounted in bearings 18, 19 and 20; it is driven by a pulley 21 fixed on it, and a belt (not shown).

On the front portion of the shaft is fixed a sprocket 22 driving an endless belt chain 23, and farther forward on the shaft is fixed a larger sprocket 22ª driving a longer endless belt chain 23ª; the diameters of the two sprockets as also the lengths of the two chains are proportioned to their respective distances from the center of the horizontal wheel 10 (or 10—10ª) so that the two chains will be moved their entire length simultaneously. The longest chain is guided over guide pulleys or wheels 24 mounted on an arch or open frame 25 secured upon the front portion of the base and having its upper portion provided with side guides 26 and a top guide 27 for guiding the chain. The shorter chain is similarly guided by pulleys 24ˣ and guides 26ˣ and 27ˣ on a smaller arch or open frame 25ˣ, as best shown in Fig. 8. In this and other views it will also be seen that some of the links in each chain are provided with lateral fingers 28, which (as shown in Fig. 4) engage bails 29 fixed at the end of the upper members 30 of each mold 30—30ˣ, which molds being provided with journals 31, 31ˣ, resting normally in bearing notches 33 in the two rings of the horizontal wheel, are constantly carried around by said wheel, but while they pass as from 30ª to 30ᵇ in Fig. 1 the chains by means of their fingers 28 lift off each upper member 30 of the molds at 30ª, carry it along the top of the open frames and put it down again at 30ᵇ, where it finds the lower member just filled with dough by an operator standing as at B in Fig. 1, while another operator, standing at A removes the baked cones from the molds, usually from the upper member where they stick slightly on the male cones, 34, while the female cones 35, not shrinking with the pastry cones free themselves from the shrunk pastry cones. The male cones are also hollow, but as that is fully described in another patent in which we are interested we need not here describe it.

It will be observed that one of the members of the mold is provided with dowel pins 36 tapered at the ends and adapted to enter into holes 36ˣ in the other member and thereby guide the inner and outer molds into exact central position. For similar purpose the two members are provided with adjacent slanting shoulders 37; a further purpose of said shoulders is to bring the center of gravity of the entire mold as much as possible to the axial line of the journals or trunnions of the molds and thus prevent accidental turning of the mold from the weight of the cones or other parts of the mold when the mold is of the form shown.

While the molds are carried through the large portion of the circle covered by the oven, that is, from 30ᵇ to 30ª, in the direction indicated by the arrow D at the front of Fig. 1, their under sides are constantly exposed to the fire and heat from a gas burner 38, which is fed from gas pipes 39—40, and is preferably made in sections secured to the pipe by nipples 41, and the upper sides are exposed to the hot air in the oven or hollow cover 7. The molds are also during said movement periodically turned on their journals, so as to expose alternately the male and the female cones to the flames of the burners. To provide for said turning of the mold each of the members 30ˣ has one of its journals, preferably the outer one, provided with an obstruction consisting of one broad pin or in the present instance two pins 42, which when the cones hang downward as in Fig. 5 are below the center of the journal, and when the cones are inverted (as in Fig. 6) they are above said center. For turning engagement with these pins are journaled on the frame work on studs 45 two rollers, 43 and 44, the former on post 3ᶠ and the latter near post 3ᵉ in Fig. 1; the roller 43 is centrally disposed in line with the pins 42 when they are above the center of the journal and the roller 44 is disposed in the line of motion of the pins when they are below the center of the journal. From this arrangement it will be understood that after each mold is filled and closed at 30ᵇ, it moves on with the outer or female cones exposed to the burners until the roller 44 is reached and said roller by retarding the first pin 42 touching it imparts half a turn of the mold, thus turning the male cones toward the burners; and as these cones are farther from the burners and less accessible to the heat from the fire, they are given longer time for exposure to the flames while they move through the greater distance from the roller 44 to roller 43, where the baking is finished, and as the other of the pins 42 is retarded by said roller 43 the mold is again given half a turn and is thus turned with the bails 29 upward ready for the fingers of the chain to engage them, as already described. The baked pastry, however, often holds the mold members so firmly stuck together that it might be an undesirable strain on the chains and their fingers to pull the members apart, for that reason each journal is provided with a central V-shaped notch 46 (see Fig. 4) in which engage two wedges 47, 47ˣ fixed the one on each of the posts 3ᶠ and 4ᶠ and having, as shown in Fig. 7, each one a horizontal straight underside for the lower mold member to pass along while the upper side forms an incline that starts the upper member upward from its sticking condition. As soon as the wedges are passed the fingers of the chains take hold and fully separate the members, as before described.

While the molds move along over the burners it is necessary to hold them more or less firmly closed during the various stages of the baking, so as to first press them together to give the pastry cones the proper thickness, then retain the molds in that position until the paste is sufficiently hardened to maintain its shape, then give the upper member of the mold freedom to yield and let out steam and hot air which may create pressure within the molds, and finally to give the mold freedom to turn on its journals when it is to make the half turns already described. With these requirements known the means therefor will be more readily understood, and they are as follows: Held by bolts 60 to the outer posts $3^a$ to $3^f$ is a horinzontally curved rail made up of sections $48^a$, $48^b$, $48^c$, $48^d$ and $48^e$, having their adjacent ends overlapped on said bolts 60, and on the inner posts $4^a$ to $4^f$ is likewise held by bolts $60^x$ a smaller curved rail made up of sections $49^a$, $49^b$, $49^c$, $49^d$ and $49^e$. Along the lower sides of these rails as tracks move antifriction rollers 50 mounted near the free ends of presser levers 51, which are pivoted at 52 to the inner and outer sides of the mold-carrying wheel 10—$10^a$ and are each provided with a notch $52^a$ adapted to engage and press upon the upper side of the journal of the adjacent mold.

The arrangement of the inner and outer rails being the same except as to size the following description of the outer rail will answer for both rails. The lower side of the first section, $48^a$, (best shown in Fig. 13) is inclined so that it presses the upper member of each mold gradually down to normal position in the pastry placed in the lower member. This section, $48^a$, is rigidly fixed on the post, except that its front end is slightly adjustable vertically on the post $3^a$; the next section, $48^b$, is rigidly fixed to the posts and is equally high at all points so as to keep the mold in normal closed position until the pastry is fairly stiffened by the heat. The third section, $48^c$, and all the succeeding sections have vertically slotted holes 53 on the bolts 60, (see Figs. 11 and 14) to allow each section to be raised slightly by the steam pressure in the molds; as soon as such pressure is relieved the section is brought down again to normal position by constantly pressing coil springs 54 (see Fig. 12) guided in a metallic pocket 55, which is fixed on the post and provided with a tension screw 56 and a plate 57 pressing the spring down upon a plate 58 placed upon the jointed ends of the sections. By means of said screw the pressure on the molds may thus be regulated as desired at various parts of the rail. The last section, $48^e$ has a slight clearing 59 (see Fig. 14) by which to relieve the pressure on the molds when they are to be turned by the roller 43. Near the roller 44 the section $48^b$ has for similar purpose a similar clearing (not shown).

The main operation of the machine having already been stated as explanatory basis for the construction, only the following details may further be mentioned. The doors of the oven are opened automatically by the passing molds and closed by their own weight. The presser levers 51 are in the front of the machine raised upward by each mold member the chains elevate, and remain standing or leaning against pegs 61 until the front ends of the rail sections $48^a$ and $49^a$ fold them down again upon each mold as it passes under said rails. The opening and turning of the molds in their bearings may also perhaps be more fully explained by referring to Figs. 6 and 7. In the latter figure the wedge 47 shown in dotted line is the same as the inner edge portion of wedge 47 to the left in Fig. 1; at 62 is shown how the gap 46 of the journal enters upon the wedge, and at 63 is shown how the upper member of the mold has been raised by passing upon the wedge. In Fig. 6 it will be understood that when the roller 43 simply rotates on a stud fixed in the frame work and the pins 42 move against it the journal $31^x$ of the mold is bound to turn.

In the modification illustrated in Figs. 17 and 18 the open frames $25^{xx}$ and $25^{xxx}$ which are alike except as to size are each so modified that instead of the several chain-guiding wheels 24 or $24^x$ revolving on studs 64 in Fig. 2, each mold lifting chain is guided by a single ring-shaped guiding wheel 65 (see Fig. 18) which rotates upon a ring-shaped or hollow stud 66, preferably with a few interposed antifriction rollers 67 to make the wheel turn easier with the chain. In this modification the main shaft 17 and pinion 16 operate the same as in Figs. 1 and 3, but the sprockets 22 and $22^a$ are fixed on a counter shaft $17^b$, mounted in bearings 68 and provided with a sprocket 69, which is driven by a link belt 70 and a sprocket 71 fixed on the main shaft 17, and the mold lifting chains are engaged by the lower sides of the sprockets instead of by the upper sides in Fig. 2. As best shown in Fig. 18, also in the modified form the open frames have guides 72 to prevent lateral twisting of the belt chains when their fingers 28 carry the upper mold members. The rear or smaller open frame needs not necessarily be open but the front or larger frame is open to admit the operators to work through it in emptying and filling the molds.

The constructional details and the arrangement of parts may be varied within the scope of the invention.

What is claimed is:—

1. In a machine for the purpose set forth, a main frame, rollers mounted in horizontal circular order on the frame, a spokeless main wheel or ring formed of two connected concentric rims, said wheel being rotatable about a vertical axis and having the lower edges of one or both of its rims guidingly grooved to the rollers; said rims having all along their upper edges open journal bearings, a series of baking molds having journals resting in said bearings and conic molds disposed between said rims, a continuous stationary heat-producing burner below the molds for a greater portion of the circle occupied by the main wheel, and a power-operated shaft operatively connected with the main wheel to turn it continuously, said molds having each at one end a projection or peg on its journal beyond the center thereof, and obstructions mounted at various points of the frame to engage said pegs and turn the molds alternately with opposite sides toward the burner.

2. In a machine for the purpose set forth, a main frame, rollers mounted in horizontal circular order on the frame, a spokeless main wheel or ring formed of two connected concentric rims, said wheel being rotatable about a vertical axis and having the lower edges of one or both of its rims guidingly grooved to the rollers; said rims having all along their upper edges open journal bearings, a series of baking molds having journals resting in said bearings and conic molds disposed between said rims, a continuous stationary heat-producing burner below the molds for a greater portion of the circle occupied by the main wheel, and a power-operated shaft operatively connected with the main wheel to turn it continuously, each of said molds and its journals being divided into two members having means for guiding them into proper meeting relation to each other, one of said members having its portions of the journals provided with bails, two upstanding frames fixed on the main frame, one within and the other and larger one outside the main wheel, endless belt chains guided to move on said frames and having at intervals lateral fingers by which to engage the bails and lift the mold members having such bails up at one side of the upstanding frames, then horizontally and then put them down at the other side of said frames, the outer one of said upstanding frames being open to admit operators to work through it upon the mold members remaining in the wheel while the upper members are carried by the chains, sprocket wheels operating the chains; said sprocket wheels being operatively connected with the power operated shaft.

3. In a machine for the purpose set forth, a main frame, rollers mounted in horizontal circular order on the frame, a spokeless main wheel or ring formed of two connected concentric rims, said wheel being rotatable about a vertical axis and having the lower edges of one or both of its rims guidingly grooved to the rollers; said rims having all along their upper edges open journal bearings, a series of baking molds having journals resting in said bearings and conic molds disposed between said rims, a continuous stationary heat-producing burner below the molds for a greater portion of the circle occupied by the main wheel, and a power-operated shaft operatively connected with the main wheel to turn it continuously, each of said molds and its journals being divided into two members having means for guiding them into proper meeting relation to each other, one of said members having its portions of the journals provided with bails, two upstanding frames fixed on the main frame, one within and the other and larger one outside the main wheel, endless belt chains guided to move on said frames and having at intervals lateral fingers by which to engage the bails and lift the mold members having such bails up at one side of the upstanding frames, then horizontally and then put them down at the other side of said frames, the outer one of said upstanding frames being open to admit operators to work through it upon the mold members remaining in the wheel while the upper members are carried by the chains, sprocket wheels operating the chains; said sprocket wheels being operatively connected with the power operated shaft, and rotary bearings on the upstanding frames for the support and guidance of the chains.

4. In a machine for the purpose set forth, the combination with molds having an endless movement and adapted to be open during a certain portion of their movement, of endless moving chains having fingers arranged to open the molds and keep them open during such portion of their movement, and then bring them together and close them again.

5. In a machine for the purpose set forth, a frame, a main wheel mounted to rotate in horizontal plane therein and having two concentric rims connected by radial braces and open journal bearings along the upper edge of each rim, a series of two-part baking molds arranged between the rims and having longitudinally split journals resting in the bearing, levers pivoted to the rims and adapted to normally rest upon the journals, horizontally curved rails mounted on the frame and adapted to exert pressure downward upon the levers and thereby on the molds, and burners below the molds.

6. In a machine for the purpose set forth, a frame, a main wheel mounted to rotate in horizontal plane therein and having two concentric rims connected by radial braces and open journal bearings along the upper edge of each rim, a series of two-part baking molds arranged between the rims and having longitudinally split journals resting in the bearings, levers pivoted to the rims and adapted to normally rest upon the journals, horizontally curved rails mounted on the frame and adapted to exert pressure downward upon the levers and thereby on the molds, and burners below the molds, said levers having near their free ends antifriction rollers for engagement with the rails.

7. In a machine for the purpose set forth, a frame, a main wheel mounted to rotate in horizontal plane therein and having two concentric rims connected by radial braces and open journal bearings along the upper edge of each rim, a series of two-part baking molds arranged between the rims and having longitudinally split journals resting in the bearings, levers pivoted to the rims and adapted to normally rest upon the journals, horizontally curved rails mounted on the frame and adapted to exert pressure downward upon the levers and thereby on the molds, and burners below the molds, said rails being formed in sections some of which are fixed and some have an upwardly yielding movement, spring pockets with springs and tension screws thereon on the frame for holding such sections normally downward in line with the fixed sections, for the purposes set forth.

8. In a machine for the purpose set forth, a frame, a main wheel mounted to rotate in horizontal plane therein and having two concentric rims connected by radial braces and open journal bearings along the upper edge of each rim, a series of two-part baking molds arranged between the rims and having longitudinally split journals resting in the bearings, levers pivoted to the rims and adapted to normally rest upon the journals, horizontally curved rails mounted on the frame and adapted to exert pressure downward upon the levers and thereby on the molds, and stationary burners below the molds, obstructions on the frame for engagement with the molds to turn them on their journals at certain points of their course over the burners, said rails having at or near said points clearings by which to relieve the pressure on the levers while the mold is being turned on the journals.

9. In a machine for the purpose set forth, a frame, a main wheel mounted to rotate in horizontal plane therein and having two concentric rims connected by radial braces and open journal bearings along the upper edge of each rim, a series of two-part baking molds arranged between the rims and having longitudinally split journals resting in the bearings, levers pivoted to the rims and adapted to normally rest upon the journals, horizontally curved rails mounted on the frame and adapted to exert pressure downward upon the levers and thereby on the molds, and burners below the molds, the first portion of each rail engaging the levers being inclined so as to press each mold gradually to a normally closed position soon after the dough is put into it.

In testimony whereof we affix our signatures, in presence of two witnesses.

P. CORNIE FLAGSTAD.
OSCAR HANSEN.
OSCAR FLAGSTAD.

Witnesses:
A. M. CARLSEN,
D. E. CARLSEN.